UNITED STATES PATENT OFFICE.

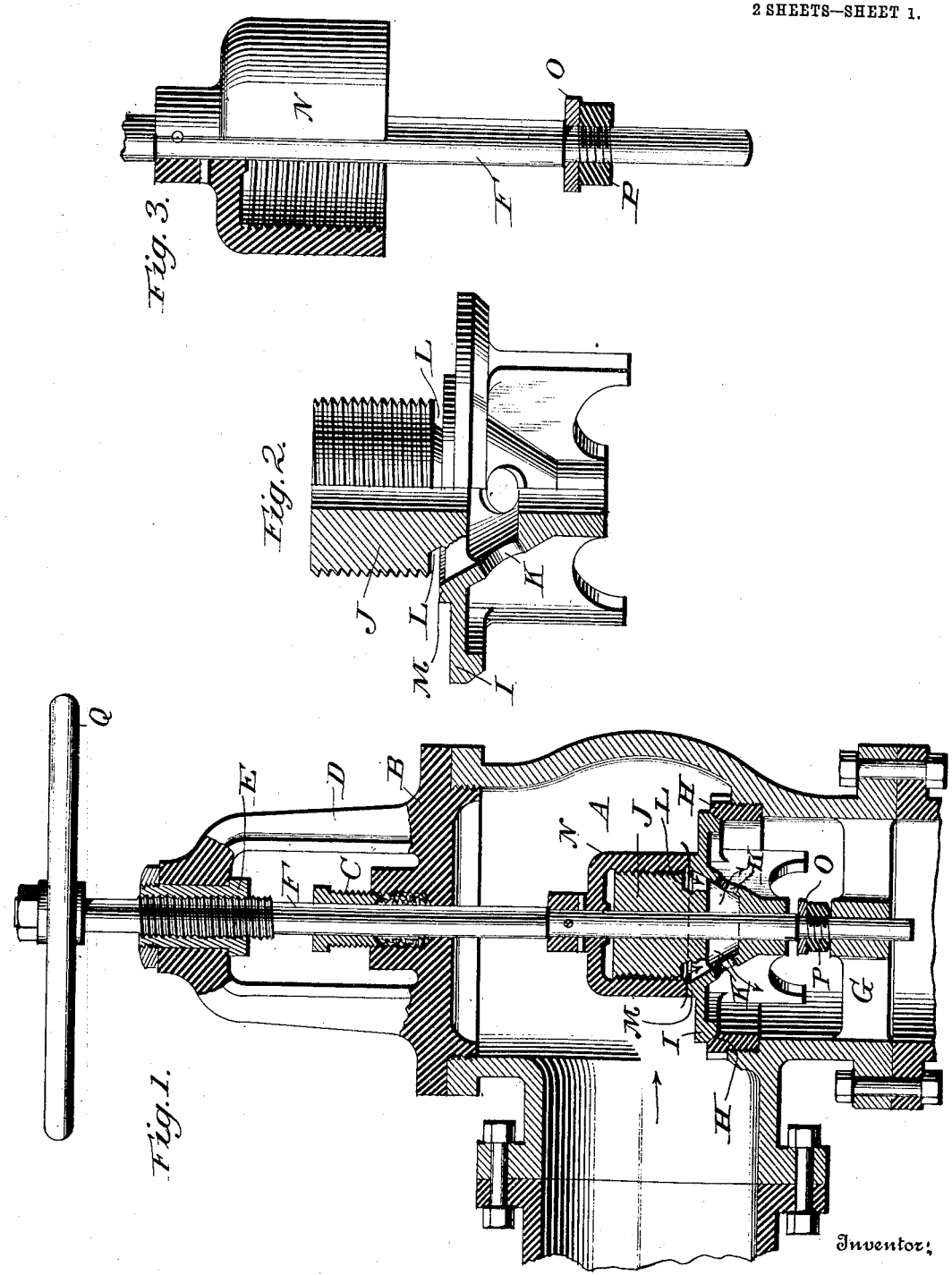

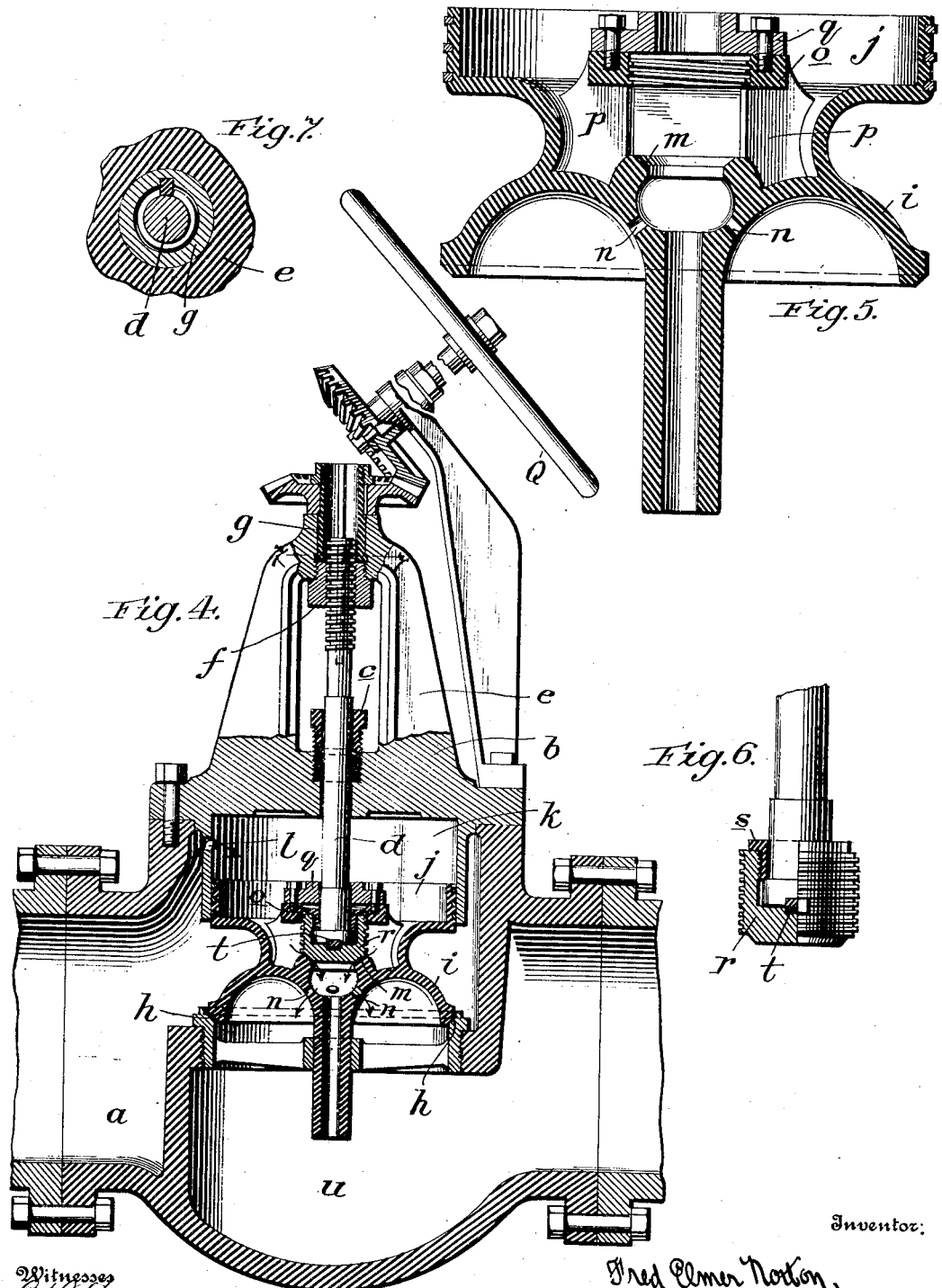

FRED ELMER NORTON, OF YOUNGSTOWN, OHIO.

THROTTLE-VALVE.

No. 851,555.  Specification of Letters Patent.  Patented April 23, 1907.

Application filed December 14, 1906. Serial No. 347,891.

*To all whom it may concern:*

Be it known that I, FRED ELMER NORTON, a citizen of the United States, residing at Youngstown, in the county of Mahoning and State of Ohio, have invented certain new and useful Improvements in Throttle-Valves, of which the following is a specification.

My present invention pertains to improvements in throttle valves, the construction and advantages of which will be hereinafter set forth, reference being had to the annexed drawings, wherein:

Figure 1 is a longitudinal sectional view of one form of my improved valve; Fig. 2, a sectional elevation, on an enlarged scale, of the main valve; Fig. 3, a similar view of the pilot valve and the valve stem; Fig. 4, a longitudinal sectional view of a modified form of valve embodying my invention. Fig. 5; an enlarged sectional view of the main valve; Fig. 6, a sectional elevation of the pilot valve; and Fig. 7, a horizontal sectional view on the line 7—7 of Fig. 4.

The main object of the invention is to provide a balanced throttle valve, which may be easily and safely opened and in which all hammering is done away with and the danger accompanying the same avoided.

The invention may be said to comprise a main valve, a pilot valve, which initially controls the admission of fluid under pressure from one side of the valve to the other, and a positive but shifting connection, such as a screw-threaded connection, between the pilot valve and the main valve, whereby movement of the main valve from and toward its seat independent of the pilot valve is prevented and hammering precluded.

In the annexed drawings two embodiments of the invention are illustrated.

Referring first to that illustrated in Figs. 1 to 3 inclusive, A denotes the valve body, B the bonnet provided with the usual packing gland C and yoke D, which latter carries a nut E through which passes the threaded portion of the valve stem F, the lower end of said stem passing into a guide G. H denotes the main valve seat, and I the main valve, said valve being provided with an upwardly extending, externally threaded head or projection J, the direction and pitch of the threads being the same as the threaded portion of stem F. Valve I is provided with ports K and L, the latter being formed around the base of the head J and the seat M for the pilot valve upon the upper face of the main valve adjacent to the head. The pilot valve comprises a cup-shaped or cylindrical member N, internally threaded and adapted to make a neat fit with the head J. Said valve is pinned to the valve stem F and at all times rotates therewith. The valve stem F passes freely through the main valve I, and a washer O, which is held in place by a nut P, is mounted upon the stem beneath said valve. Pressure upon the valve is in the direction of the arrow in Fig. 1, and the operation of the structure is as follows: Assuming that the parts are in the position shown in Fig. 1, the operator turns the hand-wheel Q and thereby rotates the valve stem, causing it to travel upwardly through nut E and at the same time to rotate the pilot valve N, causing it to move off of its seat M. This will open ports K and L and allow the fluid under pressure to pass through the main valve and consequently equalize or balance the pressure upon opposite sides of said valve. The main valve is, however, precluded from chattering or hammering on its seat by reason of the positive connection maintained by the screw-threaded head and the pilot valve. Further rotation of the stem will cause the washer O to come into contact with the under face of the main valve, and upon continuing such rotation the main valve may be readily lifted from its seat H and full passage through the valve afforded.

In Figs. 4 to 7 inclusive a modified arrangement of the invention is illustrated. The valve body *a* is surmounted by a bonnet *b*, having the usual packing gland *c*, through which the valve stem *d* passes. The yoke or frame *e* carries a nut *f*, through which the threaded portion of the stem passes. Rotary motion is imparted to the valve stem through a rotatable sleeve *g* mounted in the yoke and splined to the stem, suitable gearing being employed to actuate the sleeve. The main valve seat is denoted by *h*, and the main valve *i* is provided with a piston-head *j* which works within the cylindrical chamber *k*, which is ported at *l*. The upper central portion of the main valve *i* is provided with a valve seat $m$ for the pilot valve, and with ports $n$ which open from the lower side of the valve into the central aperture defined by said valve seat $m$. The main valve is also provided upon its upper side with a centrally disposed head piece or projection $o$, which is internally threaded, said head being preferably supported by ribs $p$ extending inwardly from the body of the valve. A collar $q$ is secured to the upper face of the head, the wall of the centrally disposed opening in said collar making a relatively close fit with the valve stem $d$. Upon the lower end of the valve stem $d$ there is mounted an externally threaded pilot valve $r$, which is held on the stem by a bushing or collar $s$ and locked to the stem by a cross-pin or key $t$, so as to rotate with said stem. The pitch and direction of the threads upon the pilot valve are the same as on the stem.

The operation of this form of the device is as follows: In Fig. 4 the main valve and the pilot valve are shown as seated. Upon rotation of the sleeve $g$ and consequent rotation and elevation of the stem $d$ the pilot valve will also be rotated and elevated and at the same time will screw into the internally-threaded head $o$. The fluid under pressure will then pass from the cylindrical chamber $k$, around the pilot valve and through the ports or openings $n$, into chamber $u$, as indicated by the arrows in Fig. 4. The passage afforded through the ports $n$ and around the pilot valve when the same is elevated is larger than that through the port $l$, whereby the different pressures existing in the chamber $k$ and in the chamber $u$ are equalized when the pilot valve is widely opened. The main valve $i$ may then be readily opened, the member $s$ coming into contact with the under face of the collar $q$, and the valves moving as one with the stem $d$ until a full port or passage is afforded through the valve.

Both forms of the invention secure the proper action of the pilot valve in a simple manner and avoid the well known difficulty present in valves of this kind where the pilot valve is free to slide longitudinally within the main valve, thereby permitting the main valve to move longitudinally independent of the pilot valve to an extent equal to the amount of lift given to the pilot valve, with the result that when the main valve is partly opened it is liable to pound or hammer on its seat when the pressure in the outtake side of the valve is fluctuating.

In the valve herein described the pilot valve may be given as great a lift as desired, the threaded connection between said valve and the main valve preventing any harmful longitudinal movement relatively to the operating stem.

In practice it has been found that the construction herein shown may be successfully used where, without the threaded engagements, the valves would immediately destroy themselves.

Having thus described my invention what I claim is:

1. In combination with a main valve, a pilot valve for controlling the passage of fluid under pressure from one side to the other of the main valve; means securing a positive engagement between said pilot valve and the main valve at all times and permitting the pilot valve to be moved from its seat independently of any movement of the main valve without becoming disengaged from the main valve; and means for raising the main valve from its seat upon a continued movement of the pilot valve.

2. In combination with a main throttle valve and valve seat, a pilot valve and valve seat; a threaded connection between said pilot valve and the main valve; means for rotating the pilot valve and lifting the same from its seat; and means acting upon a continued rotation of the pilot valve to lift the main valve from its seat.

3. In a throttle valve, the combination of a main valve provided with a threaded projection; a threaded pilot valve engaging said threaded projection and controlling ports or passages formed in the main valve; a stem connected to said pilot valve and rotatable therewith; and means for arresting the initial independent movement of the pilot valve after the same is moved off of its seat, whereby upon a continued rotation of the stem the main valve will be withdrawn from its seat.

4. In a throttle valve, the combination of a main valve provided with ports or passages extending therethrough; a threaded projection extending upwardly from said main valve; a threaded pilot valve engaging said threaded projection and adapted to close the ports or openings through the main valve; a rotatable valve stem connected to said pilot valve so as to impart rotary motion to the pilot valve; and means serving to arrest the rotary motion of the pilot valve when it has been lifted from its seat and to lock the main valve to the stem, whereby upon a continued rotation of the stem the main valve will be lifted from its seat.

5. In a throttle valve, the combination of a main valve provided with ports or passages extending through the same; a threaded projection extending upwardly from said valve; a threaded pilot valve engaging said threaded projection and serving to close the ports or passages through the main valve; a rotary valve stem; a connection between said stem and pilot valve to cause the same to turn in unison; and a lost motion connection between the stem and the main valve whereby when the pilot valve is fully opened the connection between the stem and the main valve will be established and the main valve opened upon a continued rotation of the stem.

6. In a throttle valve, the combination of a main valve; a pilot valve engaging the main valve by a threaded connection; a threaded stem rigidly affixed to the pilot valve, the pitch of the threads being similar; and means carried by the stem for engaging the main valve.

In testimony whereof I have signed my name to this specification in the presence of two subscribing witnesses.

FRED ELMER NORTON.

Witnesses:
W. S. DOUGLAS,
N. C. HURST.